United States Patent [19]

Cochran

[11] Patent Number: 4,681,260

[45] Date of Patent: Jul. 21, 1987

[54] TWO PIECE VARIABLE STATOR FOR SPRINKLER NOZZLE FLOW CONTROL

[75] Inventor: Wilson V. Cochran, Riverside, Calif.

[73] Assignee: The Toro Company, Minneapolis, Minn.

[21] Appl. No.: 828,728

[22] Filed: Feb. 11, 1986

[51] Int. Cl.⁴ .................. B05B 3/04; B05B 15/10; B05B 1/34; F16K 15/14

[52] U.S. Cl. ............................ 239/240; 239/206; 239/464; 239/472; 239/477; 239/570; 137/512.15; 137/853

[58] Field of Search ............... 239/203–206, 239/240, 443, 124, 542, 464, 472, 477, 570; 137/512.15, 512.4, 852, 853

[56] References Cited

U.S. PATENT DOCUMENTS

| | | | |
|---|---|---|---|
| 2,902,049 | 9/1959 | Ilfrey | 137/853 X |
| 3,107,056 | 10/1963 | Hunter | 239/206 |
| 3,376,884 | 4/1968 | Bucknell | 137/512.15 X |
| 3,854,664 | 12/1974 | Hunter | 239/206 |
| 4,026,471 | 5/1977 | Hunter | 239/206 |
| 4,078,726 | 3/1978 | Walto | 239/205 |
| 4,119,275 | 10/1978 | Hunter | 239/456 |
| 4,171,007 | 10/1979 | Bouteille | 137/853 X |
| 4,198,000 | 4/1980 | Hunter | 239/222.13 |
| 4,253,608 | 3/1981 | Hunter | 239/206 |
| 4,324,097 | 4/1982 | Schmitt et al. | 137/512.15 X |
| 4,471,908 | 9/1984 | Hunter | 239/11 |

Primary Examiner—Andres Kashnikow
Assistant Examiner—Patrick N. Burkhart
Attorney, Agent, or Firm—Poms, Smith, Lande & Rose

[57] ABSTRACT

A variable stator for use in a sprinkler head has a two piece stator housing which includes flexible inner sidewalls overlying spaced apertures in an outer sidewall. The stator housing includes a plurality of drive ports which pass a controlled portion of the fluid flow against an impeller that is part of the drive mechanism for rotating the nozzle of the sprinkler head. The inner sidewalls flex inwardly as a function of fluid flow around the stator relative to the controlled fluid flow to the impeller to selectively open the apertures to keep the rate of rotation of the sprinkler nozzle relatively constant. By locating the impeller within the stator, upstream of the remaining fluid flow around the stator and through the spaced apertures, wear on the impeller is minimized. In addition, turbulence through and around the stator is minimized to further reduce wear and for increased fluid flow control.

8 Claims, 4 Drawing Figures

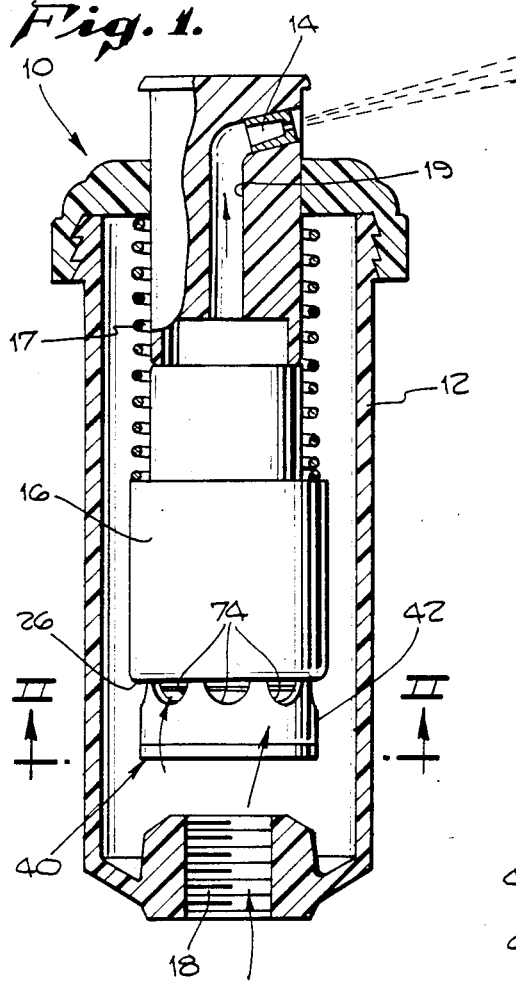
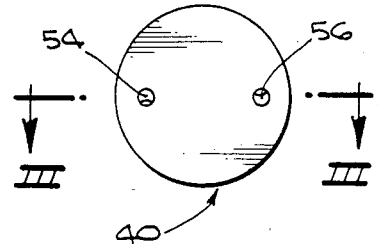
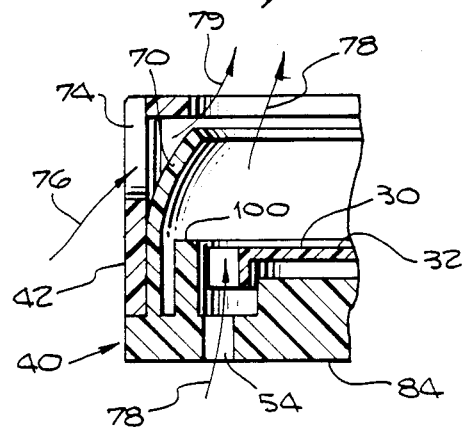
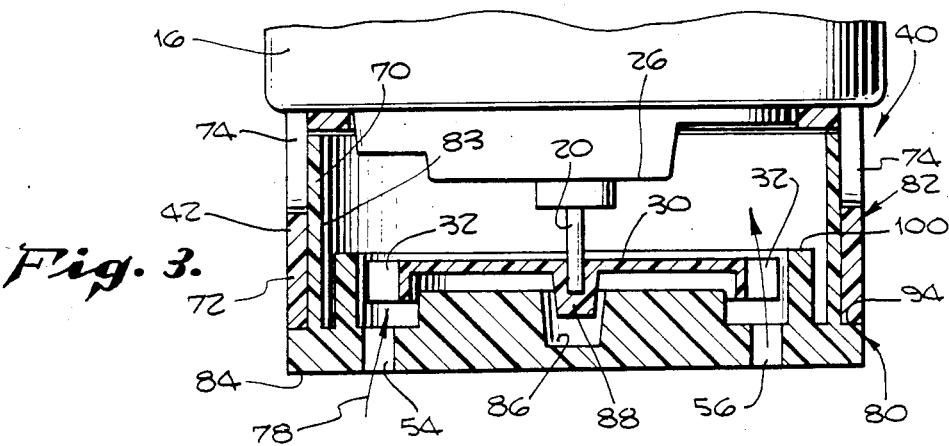

TWO PIECE VARIABLE STATOR FOR SPRINKLER NOZZLE FLOW CONTROL

FIELD OF THE INVENTION

The invention relates to sprinkler systems, and more particularly, to such systems having rotating sprinkler nozzles.

BACKGROUND OF THE INVENTION

In general, sprinkler systems, particularly those used in inground systems, include a sprinkler head which contains a sprinkler nozzle and mechanisms for controlling the fluid flow through the head to the nozzle. Rotating sprinkler nozzles include a mechanism for rotating the nozzle as a function of input fluid flow rates using the fluid flow through the head to rotate a drive mechanism to rotate the nozzle.

The drive mechanism for such rotatable sprinklers generally include an impeller actuated by fluid flow and a transmission which converts rotation of the impeller to rotation of the nozzle. Various types of nozzles can be used on such sprinklers to provide various types of spray patterns. An example of a pattern sprinkler head is taught in U.S. Pat. No. 4,471,908 to Hunter, also assigned to the assignee of the present invention.

With such sprinkler systems, a wide variation in fluid flow out of the nozzle can be obtained. However, for providing a consistent, predictable watering pattern and volume and to prevent excessive wear on the rotating parts of the system, it is desirable to control the rate of rotation of the nozzle and preferably to keep the rate relatively constant. Various mechanisms have been used for controlling the fluid flow rate to the impeller to control the rate of rotation of the nozzle.

One device for controlling the rate of rotation is the stator mechanism which has been previously used by The Toro Company, the assignee of the present invention, in certain sprinkler heads. That stator mechanism comprises a spring loaded valve which can move toward and away from a valve seat under the influence of water pressure and which is located immediately beneath the impeller. That area of the stator surrounding the valve seat is provided with two drive ports which are constantly open. These drive ports are arranged to direct a relatively constant amount of water flow against the blades of the impeller regardless of the amount of incoming water pressure or volume of water. However, if such higher pressures or volumes of incoming water are present, the spring loaded valve opens and this "excess" water is directed up through a plurality of holes in the center of the impeller and is not directed against the turbine blades.

Although the stator mechanism described above is acceptable, it is a mechanically complicated device requiring a valve head, valve seat and spring to be assembled together. In addition, because of its complexity and design it creates undesirable turbulence within the sprinkler head which can cause undesirable wear on the impeller and other parts of the head. For example, the location of the valve head and spring directly in the path of incoming fluid creates turbulence as does the passing of the "excess water" from the valve head through the holes in the center of the impeller. Turbulence can decrease the effectiveness of the stator in controlling fluid flow rates. For this reason, it would be advantageous to have a stator design for controlling the rate of fluid flow through the head which minimizes turbulence and requires a minimum of mechanical parts.

SUMMARY OF THE INVENTION

Generally stated, the improvement of the present invention includes the provision of an apertured flow control device insertable in the path of fluid flow to a sprinkler nozzle which includes a means for selectively opening an aperture in response to the rate of fluid flow around the device. More particularly, the present invention contemplates a flow device including a housing having a first aperture for passing fluid to the impeller means which drives the rotating sprinkler head and a second aperture, preferably a plurality of apertures, selectively opened by a flexible barrier member when the velocity of fluid through the sprinkler head is greater than that needed for driving the rotating sprinkler head.

In an exemplary embodiment of the present invention, the device includes a cylindrical housing having a base with openings of fixed size for passing fluid to an impeller mounted within the housing adjacent the base, and sidewalls terminating at an end portion having a plurality of apertures adjacent their end portion. An annular flexible barrier member is positioned within the housing overlying the apertures. In one exemplary embodiment, the housing sidewalls are formed of a first thermoplastic material and the base and annular flexible barrier member are formed of a second thermoplastic material less rigid than the first. In this exemplary embodiment, it is preferred that the flexible barrier member is a portion of an inner sidewall contiguous with the base and being thinner adjacent the plurality of apertures in the housing sidewall than adjacent the base.

By positioning the impeller means between the sidewall apertures and the base, the fluid entering through the sidewall apertures bypasses the impeller means so that excessive wear on the impeller is avoided. Moreover, in the exemplary embodiment, the flow control device includes only two parts to provide a mechanically simple yet effective device for controlling the velocity of fluid impacting on the impeller means.

BRIEF DESCRIPTION OF THE DRAWING

FIG. 1 is a side view, partly in cross section, showing the flow control device mounted within a rotating type sprinkler head.

FIG. 2 is a view taken along plane II—II of FIG. 1 showing the base of the flow control device.

FIG. 3 is a side cross sectional view of the flow control device taken along plane III—III of FIG. 2 illustrating the device operating at a low fluid input rate.

FIG. 4 is a partial sectional view similar to FIG. 3 illustrating the device operating at a higher fluid input rate than that of FIG. 3.

DETAILED DESCRIPTION OF A PREFERRED EMBODIMENT

With reference to FIG. 1, there is shown a sprinkler head 10 comprising a generally cylindrical housing 12 for containing a sprinkler nozzle 14 and its associated rotating mechanism, contained in an inner, coaxially mounted rotor housing 16. The exemplary embodiment shown in FIG. 1 is a rotating nozzle, pop-up type sprinkler having a spring 17 which is compressed by water pressure to cause the rotor housing 16, and hence nozzle 14, to pop up out of the housing 12. An example of such a pop-up type sprinkler is disclosed in U.S. Pat. No.

3,107,056 to Hunter entitled "Sprinkler" which patent is assigned to the Assignee of the present invention. Although the description is made with reference to pop-up type sprinklers, the invention is not limited thereto and can be used with any conventional rotating type sprinkler head.

The rotating mechanism can be any conventional mechanism for rotating a sprinkler nozzle using the water flowing to the nozzle. Examples of such nozzle rotating mechanisms as used in pop-up type sprinklers can be found in U.S. Pat. Nos. 3,854,664, 4,026,471 and 4,253,608 to Hunter, assigned to the assignee of the present invention, the teachings of which are hereby incorporated by reference. The housing 12 is reduced at its lower end and internally screw-threaded to form a water inlet 18. In addition, rotor housing 16 is open at its lower end and includes any suitable arrangement of passageways for allowing water to flow upwardly and eventually enter a central passageway 19 for passing fluid to the nozzle 14. In general, the water enters the sprinkler head through the water inlet 18 moves upwardly through rotor housing 16 passing about a sealed transmission means contained in the rotor housing 16, and then into the nozzle 14 through the central passageway 19, as is generally known in the art.

Associated with the rotating mechanism for nozzle 14 is a rotatable shaft 20 which extends from the base 26 of the rotor housing 16. Shaft 20 at its upper end extends into a transmission inside rotor housing 16 and is connected to a suitable gear train. This gear train has an output gear which is engaged within a "bull gear" that is fixed to nozzle 14 for rotating the nozzle. An impeller 30 is mounted on the lower or distal end of shaft 20. Impeller 30 has blades 32 which are impacted by the water for driving the rotating mechanism for rotation of the nozzle 14.

Turning now to the specific features of the present invention, a stator assembly 40 is provided for supplying fluid to the rotating mechanism in controlled streams for controlling the rate of rotation of the nozzle 14. The flow control device or stator 40 includes a housing 42 adapted for fitting on the rotor housing 16, for example, by a snap or screw fitting, at the base of the rotor housing. In the illustrated exemplary embodiment, the housing 42 is a generally cup shaped member having apertures therein for passing fluid through the stator to the rotor housing 16. The fluid passing apertures include one or more first passageways or drive ports 54 and 56 positioned in alignment with the blades 32 of the impeller 30. In a preferred embodiment, the drive ports 54 and 56 are a angled and are located such that fluid passing through them impacts on the periphery of the blades 32 in a tangential direction so that fluid flowing from these ports through the housing 42 causes rotation of the impeller 30 for rotating the nozzle 14. With this arrangement, the tangential force of the water rotates the impeller 30, and hence nozzle 14 through the transmission means contained in the rotor housing 16. The fixed sized openings of the drive ports 54 and 56 assure that only so much water as needed for rotation impacts on the impeller 30 to decrease problems associated with impeller wear.

A means responsive to fluid flow rates is provided in the stator assembly 40 which selectively opens one or more "bypass" stator apertures for keeping generally constant the rate of fluid flowing to impeller 30. In the exemplary embodiment, the fluid responsive means is an inner flexible portion 70 of the stator assembly 40 and the bypass stator apertures are located in an outer sidewall portion 72, for example bypass aperture 74, best shown in FIG. 4. When the fluid pressure in the fluid stream outside of the stator housing 42, indicated in FIG. 4 by exterior streamline 76, is greater than the fluid pressure of the stream from the drive ports 54 and 56, indicated by drive streamlines 78, the pressure difference will cause the annular barrier 70 to flex inwardly to permit a bypass portion 79 of the streamline 76 to enter the housing 42 through the aperture 74, above the impeller 30. Thus, the amount of water entering through drive ports 54 and 56 is kept relatively constant with excess volume being bypassed around impeller 30 through the apertures 74.

As best shown in FIGS. 2 and 3, in the exemplary embodiment, the stator assembly 40 is constructed of two parts including an inner upright cup portion 80 and an outer, annular, inverted cup member 82 that defines the sidewall 72. The inner portion 80 in this embodiment includes sidewall portion 83, with its upper edge providing the flexible barrier 70, which extends from a stator base 84 and is molded of a single thermoplastic. The stator base 84 also includes a central relief 86 which provides clearance between the impeller 30 and the stator base so as not to impede rotation of the impeller.

The second part or outer, annular, inverted cup member 82 of the stator housing in this embodiment is also preferably formed of a plastic material which is preferably more rigid than the inner portion 80. In the exemplary embodiment, the aperture 74 is one of a plurality of apertures circumferentially spaced along the upped edge of the outer portion 82 (as best shown in FIG. 1) such that an annular stator bypassing stream, illustrated as the streamline 79, is provided which travels in a generally axial direction as it joins the driving stream 78 moving toward the rotor housing 16 for a minimum turbulence in fluid flow through head 10.

To prevent unnecessary turbulence in the fluid stream 76, it is preferred that the outer surface of the stator housing 42 be as smooth as possible. For this reason, in the exemplary embodiment, the stator base 84 includes a flange 94 and the outer sidewall 72 fits on the flange to provide a smooth cylindrical outer surface for the stator.

The shape of the inner portion 80 has also been designed in the exemplary embodiment to minimize turbulence and provide a separation between the drive streamlines 78 and the exterior streamlines 76 and the impeller bypassing streamline 79. By providing a partial annular barrier 100, extending from the stator base 84 between the impeller blades 32, and the sidewall portion 83, the steamlines 78 and 79 are maintained separate to assure proper flexure of the annular barrier 70 to enhance the responsiveness of the barrier 70 to variations in fluid flow rate through the sprinkler head 10.

The operation of the stator assembly is best described with reference to FIGS. 3 and 4. If sprinkler head 10 is connected to a fluid source having a relatively low rate of flow through inlet 18, the stator assembly will have the configuration shown in FIG. 3. In this configuration, most of the incoming fluid flow passes directly upward through the drive ports 54 and 56 and acts on impeller 30 for achieving a predetermined rate of rotation. However, whenever the rate of fluid flow is greater than the amount which can be handled by the drive ports 54 and 56, the flow then is contained in the exterior streamlines 76 and will act through the apertures 74 on the flexible barrier 70 to bend the barrier away as shown in FIG. 4 and allow the bypass streamline 79 to occur. Thus, the excess fluid flow is bypassed around the impeller 30, thereby leaving the amount of fluid flowing through the drive ports 54 and 56 relatively constant. Thus, the speed of rotation of the sprinkler head will be held relatively constant. Moreover, because the bypass fluid is passed entirely around the impeller, rather than going through holes in the center of the impeller as is true in prior art arrangements, turbulence on the impeller is minimized.

As can now be appreciated, the stator assembly of the present invention provides a fluid controlling device which is responsive to a wide range of fluid input flow rates, minimizes wear on the rotating impeller of the sprinkler head and minimizes turbulence for minimizing wear on all parts of a sprinkler head exposed to the fluid flow through the head.

Although the invention has been described in relation to a particular exemplary embodiment, it is not limited thereto and various changes and modifications can be made without departing from the spirit of the invention, the scope of which is defined by the following claims.

What is claimed is:

1. In a sprinkler having a head mounting a nozzle for dispersing fluid through said head and out of said nozzle and impeller means associated with said head operatively engaging said nozzle for rotating said nozzle in response to said fluid passing through said head, the improvement comprising:

means for controlling the velocity of fluid flowing to the impeller means including a housing for mounting within the path of fluid flow toward said head, said housing having a first aperture for passing therethrough at least a portion of the fluid flowing toward said head to the impeller means and a second aperture for selectively passing fluid therethrough to bypass the impeller means;

an annular flexible barrier member in overlying relation to said second aperture for selectively opening said second aperture;

an outer sidewall portion having said second aperture therein;

an inner sidewall portion having a base for supporting the outer sidewall portion in sealing engagement therewith; and wherein said first aperture is in said base, spaced from said inner sidewall portion; and said annular flexible barrier member is an integral part of said inner sidewall portion, spaced from said base.

2. The improvement of claim 1 wherein said second aperture includes an annular array of spaced apertures within said outer sidewall portion of said housing.

3. The improvement of claim 2 wherein said outer sidewall portion of said housing is formed of a first thermoplastic material and said inner sidewall portion is formed of a second thermoplastic material less rigid than the first thermoplastic material.

4. The improvement of claim 2 wherein said annular flexible barrier portion of said inner sidewall is thinner than the remaining portions of said inner sidewall portion.

5. In a sprinkler having a head mounting a nozzle for dispersing fluid through said head and out of said nozzle and impeller means associated with said head operatively engaging said nozzle for rotating said nozzle in response to said fluid passing through said head, an improved flow control device comprising:

a first part comprising an annular member having an annular array of spaced apertures formed in an edge portion of said member; and a second part comprising a cup member including a base portion having impeller drive apertures therein for directing a first predetermined portion of fluid flow toward the impeller means associated with the sprinkler head; and an integral, vertically extending, flexible, annular sidewall portion in overlying relation to said annular array of spaced apertures whereby a second portion of fluid flow toward said nozzle head passing about said device deflects said barrier wall away from said spaced apertures to permit some of said second portion of fluid to flow through said spaced apertures.

6. In a sprinkler having a head mounting a nozzle for dispersing fluid through said head and out of said nozzle and impeller means associated with said head operatively engaging said nozzle for rotating said nozzle in response to said fluid passing through said head, an improved flow control device comprising:

a first part comprising an annular inverted cup member having an annular array of spaced apertures formed in a sidewall depending from its base; and a second part comprising an upright cup member having impeller drive aperture means in its cup base for directing a first portion of fluid flow toward an impeller positioned within said upright cup and an integral, vertically extending, flexible, annular barrier wall slip fit within said inverted annular cup member in overlying relation to said annular array of spaced apertures whereby a second portion of fluid flow toward said nozzle head passing about said device deflects said barrier wall away from said spaced apertures to permit some of said second portion of fluid to flow through said spaced apertures.

7. The device of claim 6 wherein said spaced apertures are located downstream of said impeller means so that fluid flowing through said spaced apertures when said barrier wall is deflected bypasses said impeller means.

8. In a sprinkler having a head mounting a nozzle for dispersing fluid through said head and out of said nozzle and impeller means associated with said head operatively engaging said nozzle for rotating said nozzle in response to said fluid passing through said head, the improvement comprising:

means for controlling the velocity of fluid flowing to the impeller means including a housing for mounting within the path of fluid flow toward said head, said housing including a base portion having at least one aperture therein for passing therethrough at least a portion of the fluid flowing toward said head to the impeller means;

a sidewall portion having at least one aperture therein for selectively passing fluid there through to bypass the impeller means; and flexible barrier means overlying said at least one sidewall aperture for selectively opening said sidewall aperture in response to an increase in fluid pressure about said second aperture.

* * * * *